I. KOVACS.
FEED BAG.
APPLICATION FILED AUG. 18, 1911.
1,010,152.
Patented Nov. 28, 1911.
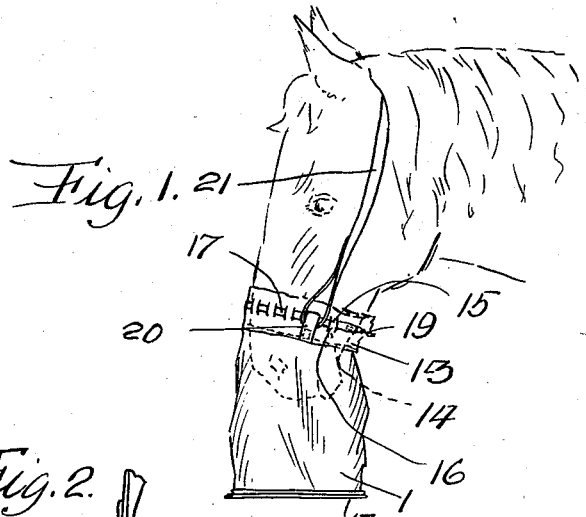
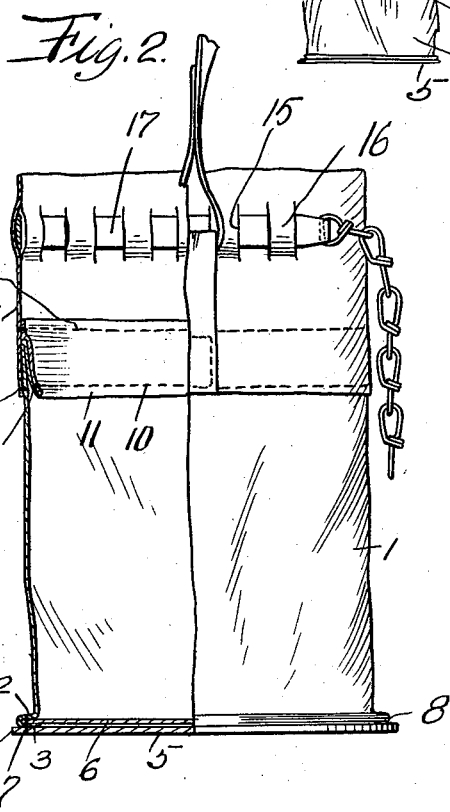
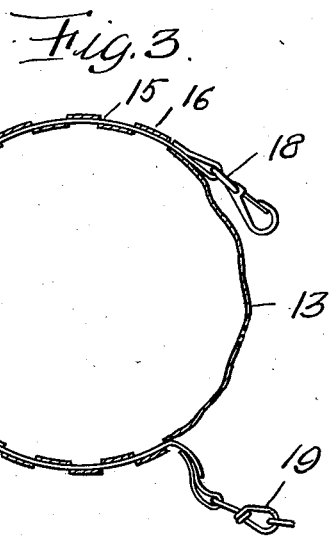
WITNESSES:
INVENTOR.
I. Kovacs.
BY
ATTORNEYS.

UNITED STATES PATENT OFFICE.

IMRE KOVACS, OF YOUNGSTOWN, OHIO.

FEED-BAG.

1,010,152.  Specification of Letters Patent.  Patented Nov. 28, 1911.

Application filed August 18, 1911. Serial No. 644,744.

*To all whom it may concern:*

Be it known that I, IMRE KOVACS, a subject of the King of Hungary, residing at Youngstown, in the county of Mahoning and State of Ohio, have invented certain new and useful Improvements in Feed-Bags, of which the following is a specification, reference being had therein to the accompanying drawing.

This invention relates to feed bags for animals, and has for its object to provide a bag of such class, in a manner as hereinafter set forth, with means for securing the top of a bag around the animal's head when the animal is eating thereby preventing the accidental spilling of the contents of the bag.

A further object of the invention is to provide a feed bag with means, in a manner as hereinafter set forth, for securing the upper portion of the bag around the animal's head when the animal is eating, thereby preventing the accidental spilling of the contents of the bag, said means being adjustable, thereby providing for its use in connection with animals' heads of different sizes.

Further objects of this invention are to provide a feed bag which is simple in construction and arrangement, strong, durable, efficient in its use, readily positioned upon the horse's head, and comparatively inexpensive to manufacture.

With the foregoing and other objects in view, the invention consists of a novel construction, combination, and arrangement of parts, as hereinafter more specifically described and illustrated in the accompanying drawings, wherein is shown the preferred embodiment of the invention, but it is to be understood that changes, variations, and modifications can be restored to which come within the scope of the claim herein appended.

In the drawings, wherein like reference characters denote corresponding parts throughout the several views—Figure 1 is a view of a horse's head showing the adaptation therewith of a feed bag in accordance with this invention. Fig. 2 is a sectional view of the bag, and Fig. 3 is a sectional plan.

Referring to the drawing in detail, 1 denotes a flexible body portion, which is preferably cylindrical in contour, and which has its lower portion out-turned, as at 2, and inturned, as at 3, to provide a pocket 4. Positioned against the inturned portion 4 is a rigid plate 5 and arranged within the body 1 and extending into the pocket 4 is a disk 6. The portions 2 and 3 of the body 1 and the disk 6 and the plate 5 are secured together, as at 7, preferably by a row of stitching. The portions 2 and 3 at the lower end of the body 1 provide what may be termed a bead 8, the latter being of less diameter than the plate 5. The plate 5 and disk 6 constitute the bottom of the bag.

The top of the body 1 is inturned to provide a flap 9, to which is secured by a row of stitching 10, a stay piece 11. The latter projects above the top of the body 1 and is secured by a row of stitching 12 to an annular flexible member 13, the latter surrounding the upper portion of the body 1 as well as being secured thereto by a row of stitching 14. The flexible member 13 projects above the body 1, and is formed near its top with a series of slits 15, to provide a circumferentially extending row of straps 16 formed by forcing the material of the member 13 outwardly. Extending circumferentially with respect to the member 13, and under the strap 16, is a shirring band 17, which is of less length than the circumference of the member 13, and has connected to one of its ends, a snap hook 18, and to the other of its ends, a chain 19.

When the bag is in position upon the horse's head, the band 17 is drawn to contract the top of the member 13 so that it will snugly fit around the horse's head, thereby preventing any accidential spilling of the contents of the bag when the horse is eating. After the band 17 has been adjusted, the ends thereof are connected together by the engagement of the hook 18 with one of the links of the chain 19; as the chain 19 is formed of a series of loops, it is obvious that a means is set up to provide for the securing of the member 13 to animals' heads of various sizes.

The member 13 is formed at each side with a loop 20, to which is connected a suspending strap 21 to the bag.

What I claim is:

A feed bag comprising a body portion, a bottom secured thereto, an annular member secured to the outer face of said body portion near and projecting above the top thereof, said member in proximity to its upper end provided with a series of vertically disposed slits forming a series of straps, said body portion having at its upper end a depending flap, a stay piece secured to said flap and to the inner face of said annular member above the top of the body portion, a shirring band extending under said straps and capable of being adjusted to contract the upper portion of said member around an animal's head, a snap hook carried by one end of said band, and a chain carried by the other end of said band and engaging with said hook for maintaining the band in its adjusted position.

In testimony whereof I affix my signature in the presence of two witnesses.

IMRE KOVACS.

Witnesses:
CORNELIUS KAISER,
CHESTER A. POUMPNS.

Copies of this patent may be obtained for five cents each, by addressing the "Commissioner of Patents, Washington, D. C."